United States Patent [19]

Stava

[11] Patent Number: 5,715,150
[45] Date of Patent: Feb. 3, 1998

[54] INVERTER OUTPUT CIRCUIT

[75] Inventor: Elliott K. Stava, Sagamore Hills, Ohio

[73] Assignee: The Lincoln Electric Company, Cleveland, Ohio

[21] Appl. No.: 753,756

[22] Filed: Nov. 27, 1996

[51] Int. Cl.$^6$ ............................................. H02M 1/12
[52] U.S. Cl. ........................... 363/41; 363/56; 363/98; 363/132; 363/17
[58] Field of Search ................................. 323/252, 261, 323/288; 363/41, 56, 17, 98, 132

[56] References Cited

U.S. PATENT DOCUMENTS

| | | |
|---|---|---|
| 4,897,773 | 1/1990 | Bilczo . |
| 5,206,800 | 4/1993 | Smith .................................. 363/21 |

*Primary Examiner*—Peter S. Wong
*Assistant Examiner*—Shawn Riley
*Attorney, Agent, or Firm*—Vickers, Daniels & Young

[57] ABSTRACT

In an inverter power supply with an output transformer including a core of magnetically permeable material with an effective area, a primary winding on the core and a secondary output winding on the core; a pulse width modulator with a first output polarity and a second output polarity for alternately creating a first gate signal during the first output polarity and a second gate signal during the second output polarity; and, means for controlling the duration of said first and second gate signals to control the alternating output current at the secondary output winding, the improvement comprising: operating the core in quadrants I and III of the B-H graph by controlling its effective area of the core and including sensing means for creating a control signal indicative of impending saturation of the core during either one of the first and second gate signals and protection means for terminating the one gate signal in response to the control signal, while allowing the pulse width modulator to create next output polarity.

20 Claims, 8 Drawing Sheets

INVERTER OUTPUT CIRCUIT

The invention relates to the art of inverter power supplies of the type primarily used for electric arc welding and more particularly an improved output circuit for an inverter used in the electric arc welding.

It is common practice in the welding art to employ inverters of the half bridge or full bridge type wherein current time is initiated by switching devices, such as FETs, with the output current pulses being controlled with a pulse width modulator operated at a high frequency, i.e. above about 5 Khz and preferably in the neighborhood of 15–20 Khz. The alternating current of the inverter is often rectified to provide a D.C. output, wherein the wave form of the current pulse is accurately controlled by a series of rapid current pulses controlled by the pulse width modulator control. When a portion of an output current pulse of a selected wave shape is to be increased, the duty cycle of the pulse width modulator is increased. In a like manner, a decrease in the output current pulse is caused by a decrease in the duty cycle of the pulse width modulator. In this manner, the rapidly created alternating current pulses of the inverter are converted into a controlled wave shape for the D.C. output pulse. Thus, the output of the power supply is controlled by the switching devices, which devices are rendered selectively conductive and non-conductive by a signal from the pulse width modulator under the control of a wave shape circuit. The output of the inverter is an alternating current with rapidly created alternating current pulses; consequently, a high frequency output transformer is provided in the output circuit. The alternating current pulses from the bridge circuit are passed in opposite flux creating directions through the primary of the output transformer. The transformer has a core and a secondary winding, or windings, wherein a succession of alternating current pulses are created. A rectifier creates the D.C. output current of the power supply. A succession of controlled D.C. current pulses is applied through the primary winding of the transformer. In some instances, the primary winding has two discrete portions. A first pulse is switched through the primary winding in a selected direction to cause a corresponding current flow in a first polarity in the output winding or windings on the transformer. Thus, a D.C. current gated or switched through the primary winding creates a corresponding output current pulse in the output winding. This output winding is connected in parallel across the output terminals of the power supply. In a like manner, a current in the opposite direction is passed through the primary of the transformer so that the core of the transformer creates an opposite polarity output pulse across the output terminals. The rapidly gated alternating current pulses in the output winding of the transformer are D.C. output current pulses, which pulses are controlled by a large number of the individual or discrete pulses. In practice, the inverter power supply operates at a frequency of approximately 20 Khz, so that a large number of discrete output current pulses are generated. Consequently, inverter type power supplies have required relatively expensive cores formed from expensive core material having large cross-sectional areas to prevent saturation or saturation creep during the rapid application of flux in opposite directions.

The core of the high frequency transformer often include ferrite core material that reduces core loss. The objective of designing the core for the high frequency output transformer of an inverter type power supply is to prevent saturation, since saturation causes a virtual short across the primary winding allowing a large current rise in the switching devices. These current spikes can cause damage to the switching devices or require expensive protective circuits. Such damage is costly and must be avoided in the design of the core of the inverter type power supply. Several factors are considered in the design of a high frequency, high power transformer of the type under consideration. Factors such as weight or core volume, core loss, applied voltage, operating frequency and flux density are factors in consideration of the output transformer design. The primary voltage, which affects the current flow in the switching devices, is determined by a number of parameters set forth in the following formula:

$E_p = N_p * A_c * \Delta B / \Delta T * 10^{-8}$ $E_p$ = Primary Voltage $N_p$ + Number of Primary Turns $A_c$ = Core Area (in $cm^2$)

$\Delta B$ = Flux Change in Gauss $\Delta T$ = Time in seconds for $\Delta B$

In the design of a core, wherein the primary voltage $E_p$ and the duration or time in seconds $\Delta T$ are constant or generally fixed, the transformer core design is relatively straightforward. Consequently, the use of an inverter for low rated power supplies used to charge, for example, automotive or marine batteries are relatively simple to design and can efficiently use the total volume of the material forming the core. These power supplies are typically below about 300 watts. However, in the inverter type power supply to which the present invention is directed, i.e. above 300 watts, the frequency is fixed by the set oscillator of the pulse width modulator, but the conduction time or duration $\Delta T$ is varied. The duty cycle or duration is adjusted rapidly to maintain a desired output voltage or current. In electric arc welding the frequency remains the same, albeit a high frequency over about 5 Khz, but the duration $\Delta T$ of each pulse is varied to accurately control the output current wave shape of the D.C. welder. In addition, D.C. welders also regulate output power or energy. In these applications the duty cycle of successive opposite polarity pulses in the primary winding have different durations, which changes in duration can seriously affect the magnetization and demagnetization of the core. An electric arc welding using either a half bridge inverter or a full bridge inverter normally includes a pulse width modulator having a duty cycle which varies from pulse to pulse. The duration or conduction time during the successive half cycles is varied or modulated to control the output current of the high frequency transformer. It is therefore important that the total flux change in one direction equal the total flux change in the opposite direction within the core.

When a pulse width modulator is used to control a conventional half bridge or full bridge inverter, the transformer is designed with a core necessary to supply the required output power to the welding operation. The area of the core is selected so that the change in flux from one pulse to the next pulse does not saturate the core causing high current to flow through the switching devices, such as transistors, FETs, GTOs or IGBTs. If the volt-second conduction is equal during adjacent periods, or opposite polarity conditions of the inverter, and the core is designed with this volt-second rating, the core will not saturate. However, if the volt-seconds in the transformer core always favors one polarity over the other, the core saturation will eventually occur. Saturation is exaggerated in a pulse width modulated inverter of the type used to produce controlled wave shapes at the output of a D.C. welder. A common current mode pulse width modulator includes an internal circuit which tends to prevent core saturation. This circuit creates a signal representing the primary current in the transformer core. This sensed current of the core is applied to the pulse width modulator. If high primary currents flow, the pulse width modulator turns off the gating signal to the proper switching device. This action prevents damage of the particular switch device, which would have been subjected to the high current flow. Consequently, current feedback causes a switching device which is to be subject to high current to become non-conductive thus protecting the switching device from over current. Thus, the internal circuitry of the chip of the pulse width modulator shuts down the pulse width modulator when the current in the primary winding exceeds a preselected threshold value. In controlling a pulse width modulator in this fashion, a large area core is also needed so the magnetization of the core operates along a curve in quadrant I of the B-H graph. The pulse in the positive direction through the primary magnetizes the core toward its quadrant I saturation. If there is no over current, the next pulse demagnetizes the core along the B-H graph in quadrant I. If there is an over current condition, the pulse width modulator is deactivated and awaits the next opposite polarity gating pulse. By using a large transformer core, saturation is avoided. It has been found that if the core size is decreased, the magnetization curve can be shifted into the quadrant III with the core being demagnetized and then remagnetized. Without a sufficient head, saturation occurs in both quadrants. Indeed, reduction in the area of 50% in a standard inverter transformer core has forced the magnetization curve into quadrant III causing severe saturation problems and resulted in high transformer primary currents. With high power and high frequency operation, this unacceptable condition could not be avoided by the over current circuit of the pulse width modulator chip. For that reason, the core of a high frequency inverter for electric arc welding has been relatively large to cause magnetization and demagnetization in the quadrant I of the B-H magnetization graph. There was no use of quadrant III. This solution to the magnetization problem in electric arc welders is expensive and substantially increases the total weight of the power supply.

INCORPORATION BY REFERENCE

Prior U.S. patent Bilczo U.S. Pat. No. 4,897,773 discloses a full wave inverter used for D.C. electric arc welding of the type to which the present invention is directed; however, separate primary windings and secondary windings are illustrated. This patent is incorporated by reference herein as background information.

THE INVENTION

There is a need for a high frequency inverter that can employ a smaller core in the output transformer. This objective has been obtained by the present invention wherein the transformer core is reduced in size to cause magnetization in both quadrant I and quadrant III of the B-H graph, even though the pulse width modulator is used to intentionally vary the duty cycle of alternate polarity current pulses to the primary of the output transformer. In accordance with one aspect of the invention, the pulse width modulator prevents saturation by detecting impending high current in the primary winding of the transformer. Upon detecting the impending high current condition, indicative of core saturation or the approach of saturation, the switching device used during this particular operating condition of the pulse width modulator is shut off and becomes non-conductive. Thus, no current flows until the conduction of the opposite polarity switching device during the next opposite polarity operating condition of the pulse width modulator. The pulse width modulator includes a variable pulse width controlled at a given frequency. The conduction of the switching device in one polarity current pulse is substantially shorter than the next current pulse in the opposite polarity. This prevents core saturation by detecting the imminent core saturation and terminating the conduction of the switching device. However, there is a normal dead time followed by a maximum conduction in the opposite direction. This operation has the advantage of reducing the cost of the transformer and reducing the amount of core material, such as ferrite. In addition, the type of core material and the rating of the switching devices is not critical. Thus, a substantial savings is obtained, especially in welding devices requiring large cores. If the conduction periods of the adjacent currents were changed slowly, core saturation is prevented by this particular implementation of the present invention. By using the invention, as defined above, a core can be reduced in size and magnetization is in both quadrant I and quadrant III. There is no saturation, or progressive increase of flux toward saturation, during high frequency operation of the output transformer. The present invention is applicable to high frequency, high power applications. The invention would not be needed for relatively low frequency inverters, such as inverters operating at less than about 3 Khz.

It has been found that the first implementation of the present invention as described above will not always accommodate rapid current response, as required in high frequency inverters used for D.C. electric arc welding. The dead time after detection of saturation, which is not a problem in some high frequency applications, is a problem when the D.C. welder requires an immediate influx of high current, obtainable only by a long duty cycle for the pulse width modulator. Consequently, the present invention has a preferred embodiment. This more specific embodiment includes a sensing circuit to detect the di/dt of the input current. The sensing circuit is a differentiating circuit with an output that is proportional to the derivative of the rate of change of the voltage or signal. A saturation signal is produced when the output voltage of the circuit indicates a certain di/dt of the input voltage has been reached. In accordance with this more specific embodiment of the invention, the saturation signal controls the external capacitor of the pulse width modulator, which capacitor is normally charged by a constant current source through a known resistor to set the frequency of the pulse width modulator. The increase of voltage across the capacitor during a charging cycle creates a linear voltage ramp, which ramp intersects a reference voltage during each period of the pulse width modulator. When the capacitor voltage reaches the reference voltage, the external capacitor discharges and the new ramp voltage is generated. This ramp generation by the external capacitor creates the phases or periods of the pulse width modulator. Consequently, the external capacitor, together with the reference voltage, determines the frequency of the pulse width modulator. This frequency, in practice, is generally approximately 20 Khz. Each operating period, output condition or phase of the pulse width modulator has a fixed period, since the external capacitor is repeatedly charged through the same resistor. A gating signal is developed during each period of the pulse width modulator. Successive gating pulses actuate opposite polarity switching devices. The conduction time of the switching devices during each output condition or phase of the pulse width modulator is controlled by the gating signals. By adding a voltage source and a switch to abruptly charge the external capacitor, whenever an impending saturation of the core is indicated by a saturation signal, the external capacitor abruptly shifts to a high voltage intersecting the reference voltage of the ramp generating circuit. This intersection not only terminates the actual current pulse but also terminates the phase or output condition to halt the operating phase. Thus, the next operating phase occurs immediately. The duration of the phase is shortened, which results in a momentarily increase in the operating frequency of the pulse width modulator. The next phase or output condition is immediately initiated. By reducing the size of the core and using the present invention, the core is magnetized, demagnetized and remagnetized using both quadrant I and quadrant III of the B-H graph. In accordance with the invention, the size of the core is reduced thus reducing the magnetization head room and causing operation in both quadrants I and III of the B-H graph. This low head room operation, without saturation problem, is possible by using the present invention and more particularly the preferred embodiment of the present invention.

In accordance with the present invention there is provided an improvement in an inverter power supply having an output transformer, including a core of magnetically permeable material with an effective area, a primary winding on the core and a secondary winding on the core. The inverter has a first switch means for passing current through at least a portion of the primary winding to create a current pulse having a first polarity in the secondary output winding when the first switch means is conducting and a second switch means for passing current through at least a portion of the primary winding to create a current pulse having a second polarity in the secondary output winding when the second switch means is conducting. This type of inverter includes a pulse width modulator with a first output condition, or phase, and a second output condition, or phase, means for alternately creating the phases or output conditions at a selected rate over about 5 Khz to create alternating periods of first and second phases or output conditions. There is provided means for creating a first gate signal during the first output condition to render the first switch means conductive and means for creating a second gate signal during the second output condition to render the second switch means conductive. The duty cycle or duration of the first and second gate signals is used to control the alternating output current at the secondary output winding of the transformer. The improvement in this inverter type power supply involves operating the core in quadrants I and III of the B-H graph by controlling its effective area and including means for creating a control signal, or saturation signal, indicative of an impending saturation of the core during either one of the first or second gate signals and protection means for terminating the one gate signal in response to the control signal, while allowing the pulse width modulator to create the next output condition. The phrase "impending saturation" also includes saturation detection itself. The use of at least 5 Khz indicates an operating condition of the invention that is substantially greater than a low frequency inverter, such as one operating below about 3 Khz. In accordance with the preferred embodiment of the invention, the protecting means includes means for terminating the output phase, or condition, corresponding to the gate signal whereby the period of the phase is actually shortened to immediately initiate the next phase or output condition. This later embodiment is advantageous when a high current is required and a dead time or space in the availability of current will not accommodate transient conditions or high current demands. Such high current demands exist with D.C. electric arc welders, which process normally employs this preferred aspect of the present invention, wherein the phase or output condition is terminated generally at the same time as the output current is terminated from the pulse width modulator.

The primary object of the present invention is the provision of an inverter power supply of the type particularly adapted for the fast response of a D.C. electrical arc welder operated with frequency over about 5 Khz, which inverter includes an output transformer having a reduced effective area forcing the transformer to operate in quadrants I and III without core saturation.

Another object of the present invention is the provision of an inverter power supply, of the type defined above, which inverter allows the high frequency operation of switching devices which need not be matched since the core of the output transformer will not saturate due to variations in the conduction time from one phase to the next phase of the pulse width modulator.

Yet another object of the present invention is the provision of an inverter as defined above, which inverter includes a transformer core that is reduced in cross section, while operation of the core magnetization curve in quadrant I and quadrant III without requiring expensive core material or expensive matching of the switching devices.

These and other objects and advantages will become apparent from the following description taken together with the accompanying drawings.

PREFERRED EMBODIMENT

Figure 5:
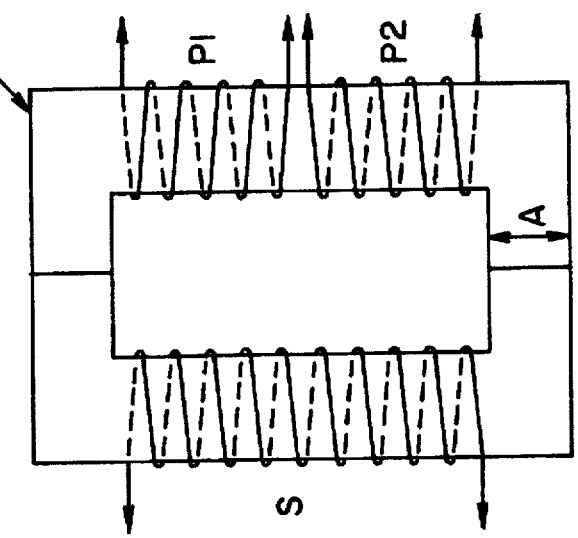
FIG. 5 is a side elevational view showing, somewhat schematically, the core used in the high frequency output transformer T of the inverter illustrated in FIG. 1 with the secondary and primary windings shown as they are wound on the spaced legs of the core C.
Figure 6:
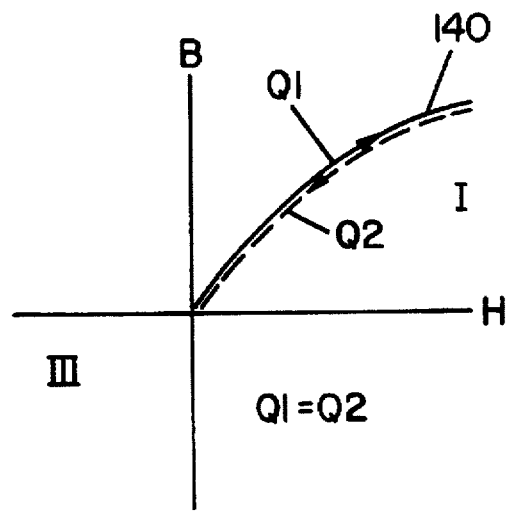
FIG. 6 is a B-H graph for magnetization of the transformer core C illustrated in FIG. 5, when the inverter shown in FIG. 1 pulses the transformer with opposite pulse Q1 and Q2 shown in FIG. 2.

Referring now to the drawings wherein the showings are for the purpose of illustrating preferred embodiments of the invention only and not for the purpose of limiting same, FIGS. 1–6 show the somewhat standard full wave inverter power supply 10 having D.C. input terminals 12–14, which terminals can be connected directly to the output of a three phase rectifier for providing D.C. current at a regulated voltage. A first switching branch includes switch devices 20, 22 illustrated as transistors, but which could be FETs, GTOs or IGBTs, that are conductive when a gating signal $Q_1$ is applied to the base of the transistors. A pulse of current also identified as Q1 is passed through section P1 of the primary winding or core C of transformer T. Diodes 24, 25 prevent reverse current flow in section P1 and allow free wheeling. A second current branch including switching devices 30, 32 for conducting current pulse Q2 when a gating signal $Q_2$ is created. Current pulse Q2 passes through section P2 of the primary winding on core C. Diodes 34, 35 prevent reverse flow in section P2 and allow free wheeling. This basic inverter architecture allows conduction in the first branch to create current flow through primary section P1 during one phase of operation. During the second phase of operation, switching devices 30, 32 are conductive for a period of time to cause current flow Q2 in section P2 of the primary. In practice, the primary sections P1, P2 could be a single primary winding, with a circuit causing reverse flow through the winding. In the illustrated embodiment, the current flow through the primary sections is in the same direction; however, the sections wound are in opposite turn relationship to produce a positive current flow Q1 in the primary during conduction of one branch and negative current flow Q2 in the primary during operation of the second branch. By alternating the operation of the two branches, an alternating current is applied to the primary of transformer T. Inverter 10 has a capacitor 40 to allow current flow during free wheeling through primaries P1, P2. Core C is designed for high frequency operation greater than 5 KHz and preferably in the neighborhood of 20 KHz. Core C has heretofore had a cross section A which is relatively large when used for high frequency operation in a D.C. electric arc welder. By having a large area, core C will be magnetized and demagnetized along a curve restricted to quadrant I of the B-H graph, as shown in FIG. 6. Magnetization occurs when current flows in one of the primary sections P1, P2 and demagnetization occurs during current flow in the other section of the primary. The size of the core was heretofore such that there would be no saturation during high frequency operation, even with changing durations of the magnetizing and demagnetizing process. The magnetization curve was in quadrant I and merely magnetized and demagnetized. It has been found that when using a high frequency transformer for high power (i.e. above about 300 watts), such as electric arc welding, a reduction in the size of core C will cause saturation both in magnetization by the positive polarity current pulse and in demagnetization and remagnetization by the negative polarity current through the primary winding. To protect the switching devices, the large area core C was necessary.

Figure 2:
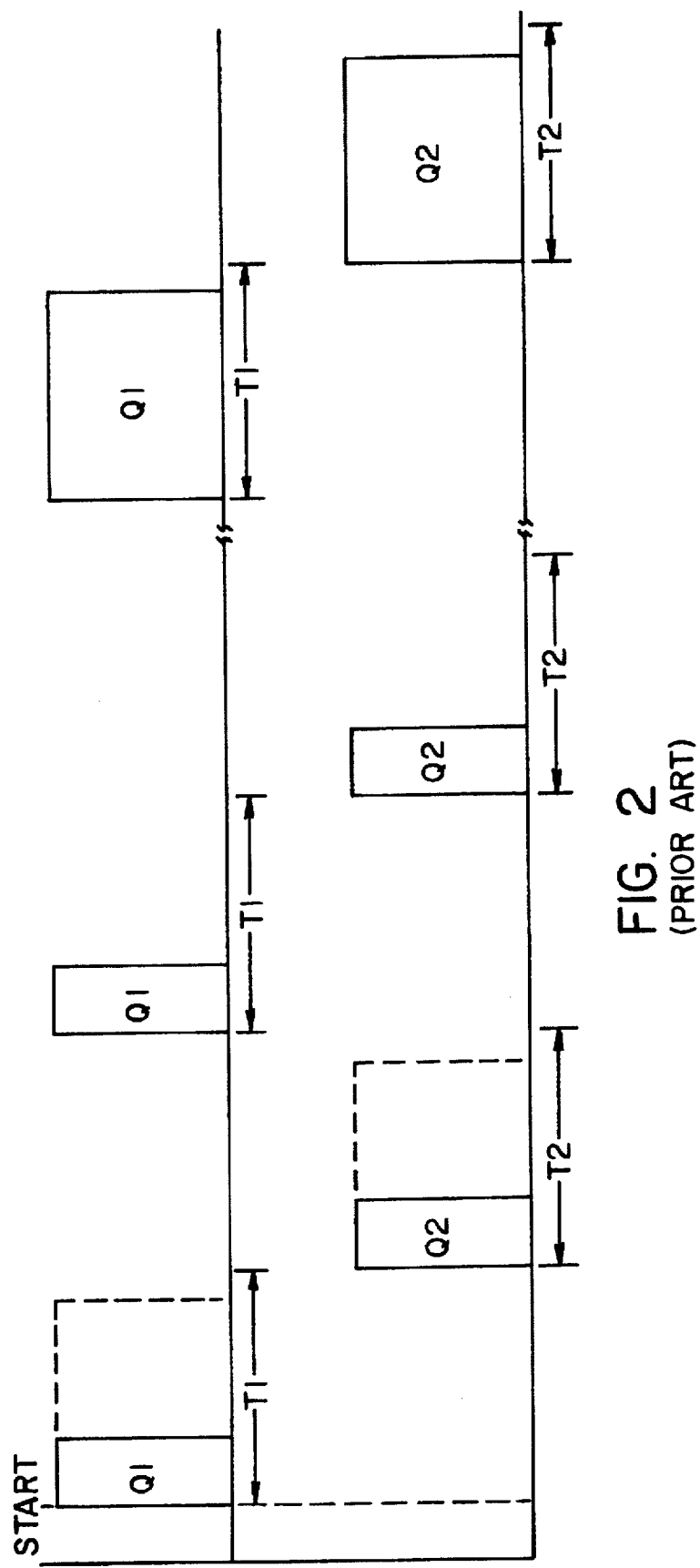
FIG. 2 is a current pulse graph showing the input current pulses to the inverter transformer during alternate conduction times Q1 and Q2 controlled by a pulse width modulator.
Figure 3:
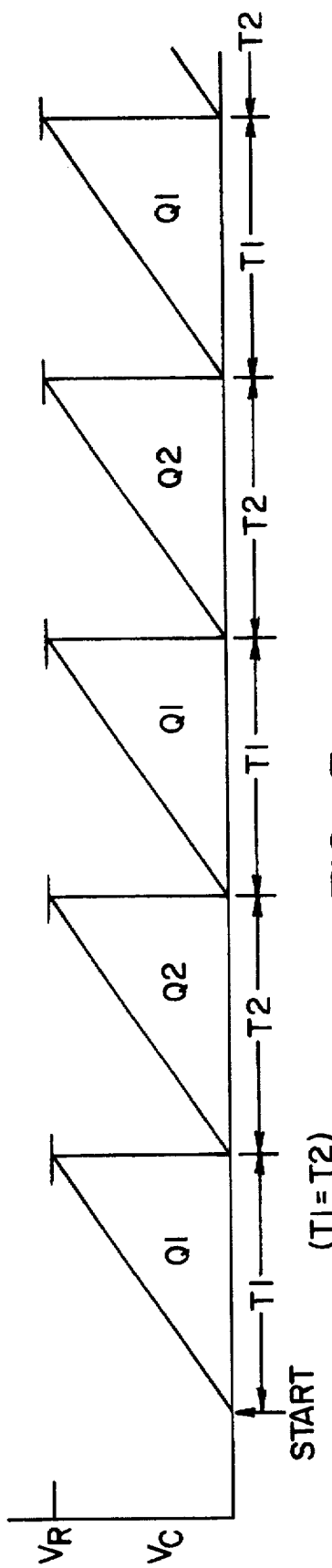
FIG. 3 is a voltage diagram showing the ramp generators used in the pulse width modulator for alternating between the phases or output operating conditions of the inverter shown in FIG. 1.
Figure 4:
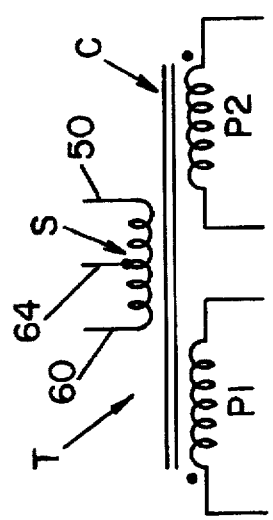
FIG. 4 is a schematic representation of the primary windings and secondary windings of the inverter transformer T illustrated in FIG. 1.

The output of transformer T is by secondary winding S. Current flow in one primary winding causes current through line 50 and diode 52, whereas current flow in the other phase of the primary winding causes current flow in line 60 and through diode 62. A common line 64 makes the output circuit a rectifier, with the negative terminal 64 and a positive terminal 66 connected to a D.C. welding station 70, having electrode 72 connected to positive terminal 66 and workpiece 74 connected to negative terminal 64. High frequency operation of transformer T generates a direct current across welding station 70. The shape of the output pulse during a welding cycle is controlled by a large number of independent, individual current pulses created in a rapid succession, i.e. at a high frequency. In this manner, the wave shape of the D.C. output pulse can be controlled accurately by changing the conduction time during each of many operating phases of the switching devices 20, 22 or 30, 32 during a single output cycle. To control the duty cycles of the switching devices, a standard pulse width modulator 100 creates the output signals $Q_1$, $Q_2$ in output lines 102, 104, respectively. The pulse width modulator is in the form of a standard integrated circuit chip, which operates to shift from phase Q1 to phase Q2 at a fixed frequency. The frequency is controlled by the ramp voltage on capacitor 112 which is charged toward the positive voltage B at a rate determined by resistor 110. As shown in FIG. 3, pulse width modulator 100 has alternate phases T1, T2 during which gating signals $Q_1$, $Q_2$ are created on lines 102, 104, respectively. The time of phases or periods T1, T2 is controlled by a ramp generator which charges capacitor 112 toward voltage B. A reference voltage appears on line 120, which reference voltage is adjusted by the rheostat 122. As capacitor 112 charges toward positive voltage B the voltage ramp shown in FIG. 3 intersects the reference voltage set by rheostat 122. At that instance, the particular phase of the pulse width modulator is terminated and the next phase is started. Referring now to FIG. 2, the duty cycle for the switching devices is represented by the time a signal $Q_1$ or $Q_2$ remains on line 102 or line 104. This concept is represented by the current pulse Q1 during period T1 or current pulse Q2 during period P2. When a low current is required across welding station 70, the duty cycle for the switching devices is relatively low. This low duty cycle causes short pulses, either Q1 or Q2, at the output of the pulse width modulator. FIGS. 2 and 3 are to be considered together. FIG. 3 illustrates creation of the alternating phases or operating conditions T1, T2. FIG. 2 illustrates the operation of the pulse width modulator to control the mount of output current Q1 or Q2 at a given instance during the formation of a desired current pulse during a welding cycle. High current requires conduction for a longer period of time or a higher duty cycle for Q1 or Q2. To determine the mount of current at any given time in the welding cycle, there is provided a pulse shape control 130 having a start cycle input 132. During a single welding cycle, the wave shape control 130 determines the magnitude of the current at any given instance. The higher the desired current, the higher the duty cycle for the pulse width modulator and the greater time that the signals $Q_1$, $Q_2$ are applied to the basis of the switching devices. As so far described, description of full bridge inverter 10 forms background to which the present invention is an improvement. This standard full bridge inverter has a relative large core C, as schematically illustrated in FIG. 5. The windings forming the primary winding of the transformer T are schematically illustrated in FIG. 4 as including two separate sections P1, P2; however, a single winding could be used with the branches of the inverter causing opposite current flow through the winding. In practice, separate windings P1, P2 are included. Indeed, on occasion secondary S is in two separate sections, as shown in Bilczo U.S. Pat. No. 4,897, 773.

Figure 7:
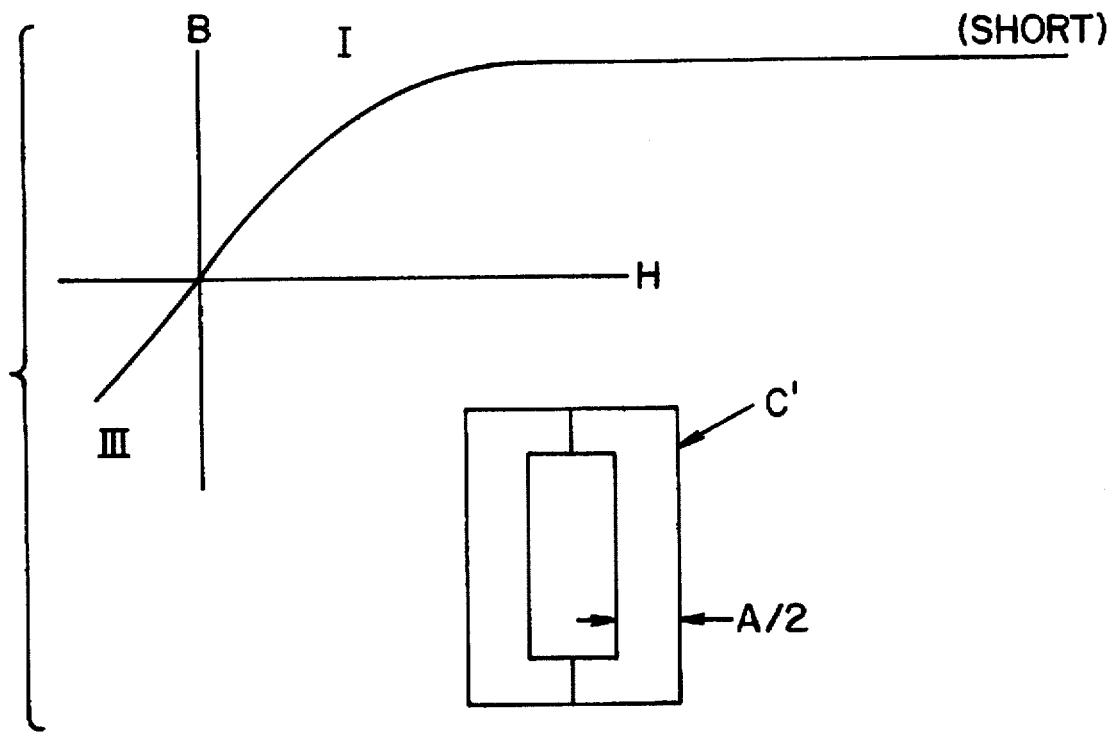
FIG. 7 is a side elevational view similar to FIG. 5 showing the core C' of the transformer for the inverter power supply with an effective area approximately 50% of the effective area for the core C shown in FIG. 5 and a B-H graph illustrating the effect of reducing the effective area of core C to core C' without implementation of the present invention.

The present invention relates to a modification of the pulse width modulator 100 to allow use of a core having a reduced area A, which area can be as small as approximately half the normal cross-sectional area of core C. This core C' is schematically illustrated in FIG. 7 having a reduced size A/2, which in the past caused drastic operating difficulties, especially in high frequency, rapid response inverters of the type required for electric arc welding. By using a large core as C, shown in FIG. 5, the core is magnetized and demagnetized in a curve restricted to quadrant I of the B-H graph. This is shown in FIG. 6 wherein magnetization occurs during current pulse Q1 and demagnetization occurs during current pulse Q2. If these two pulses are identical, operation in quadrant I is appropriate. Magnetizing and demagnetizing is equal. However, since transformer T is operated at a high frequency, even slight differences in the duration of the pulses in the separate switching branches may ultimately cause the magnetization curve 140 of the core to creep into saturation. By using a large core with area A and operation only in quadrant I, saturation can be minimized. When core area A is reduced in half, i.e. A/2, the operation of the opposite polarity switching branches of the inverter will cause the magnetization and demagnetization curve 140 to extend into quadrant III; however, there would not be enough capacity or "head room" to prevent a short circuit condition as illustrated in B-H graph of FIG. 7. If a short occurs, transformer T becomes a short circuit at the primary winding. Additional current is not blocked by the permeability of the magnetic core. In the prior art, core C with area A or the reduced size core C' of FIG. 7 with area A/2 are formed of ferrite to reduce core losses. This ferrite material is highly permeable, but relatively expensive. The present invention relates to the ability to modify the function of core C' by changing the operation of pulse width modulator 100 to allow a substantial reduction in the size of the core of the output transformer T as illustrated by core C' in FIG. 7. This was not practical with normal operation of the pulse width modulator in an electric arc welder. This core C' is used in the inverter of FIG. 1 without resulting in short circuit of the primary as shown in the B-H graph of FIG. 7.

Figure 1:
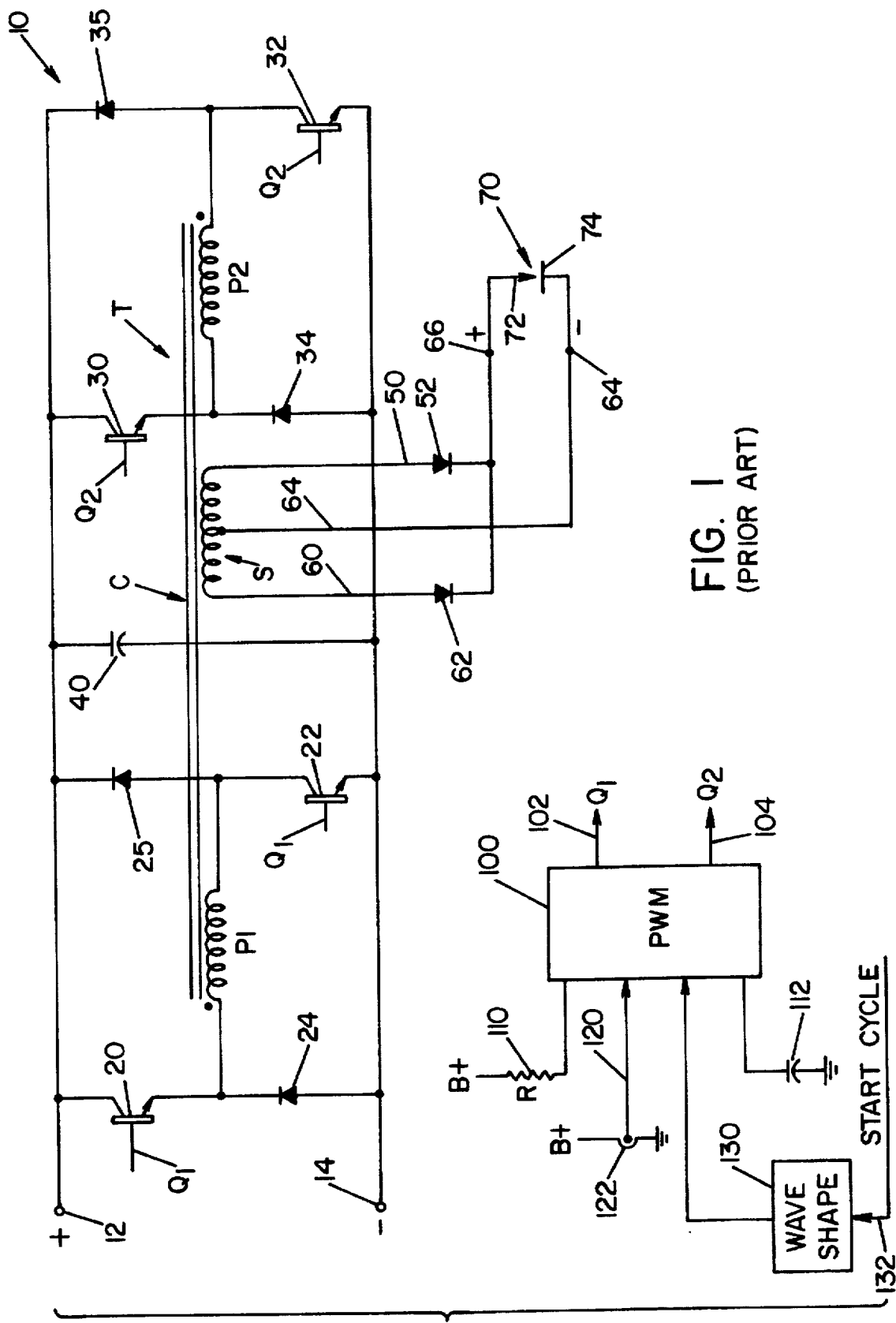
FIG. 1 is a wiring diagram of a prior art full wave inverter power supply used for a D.C. electric arc welder.
Figure 8:
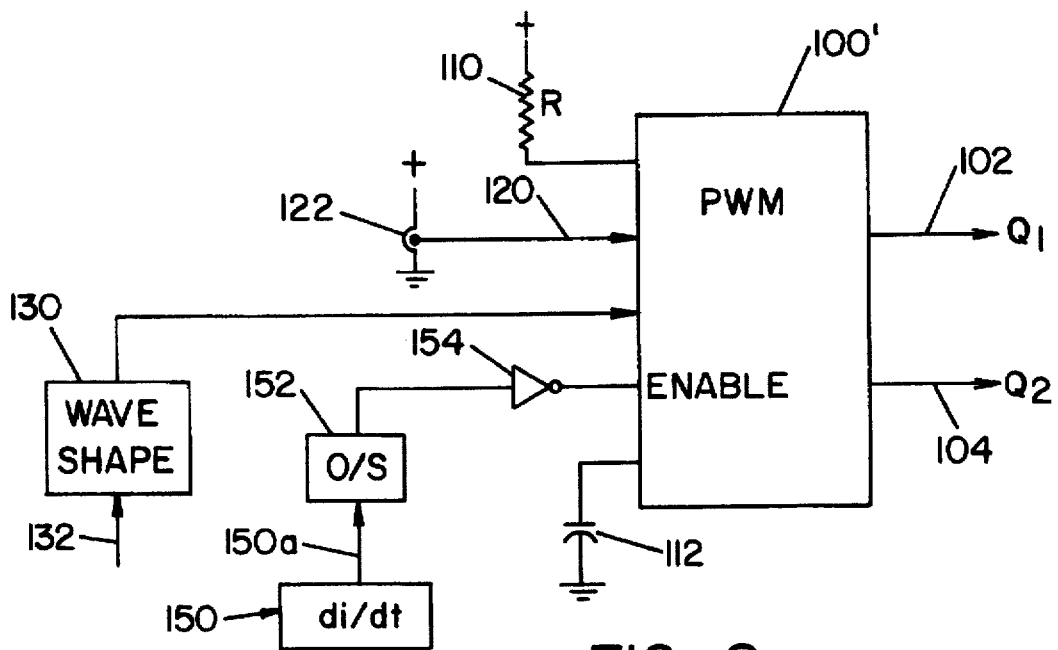
FIG. 8 is a schematic diagram showing the pulse width modulator used for a high frequency inverter as shown in FIG. 1 and incorporating peripheral elements to practice the broadest aspect of the present invention.
Figure 8A:
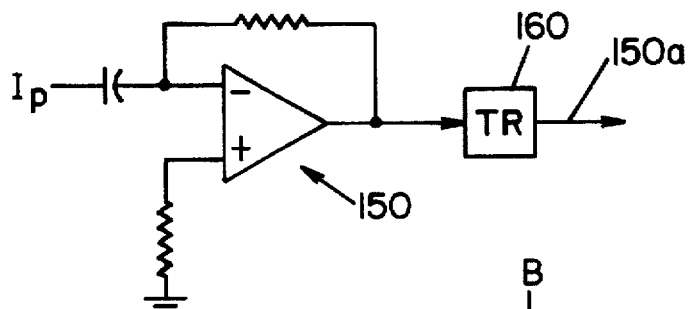
FIG. 8A is a wiring diagram showing a circuit for sensing the impending saturation of core C'.
Figure 9:
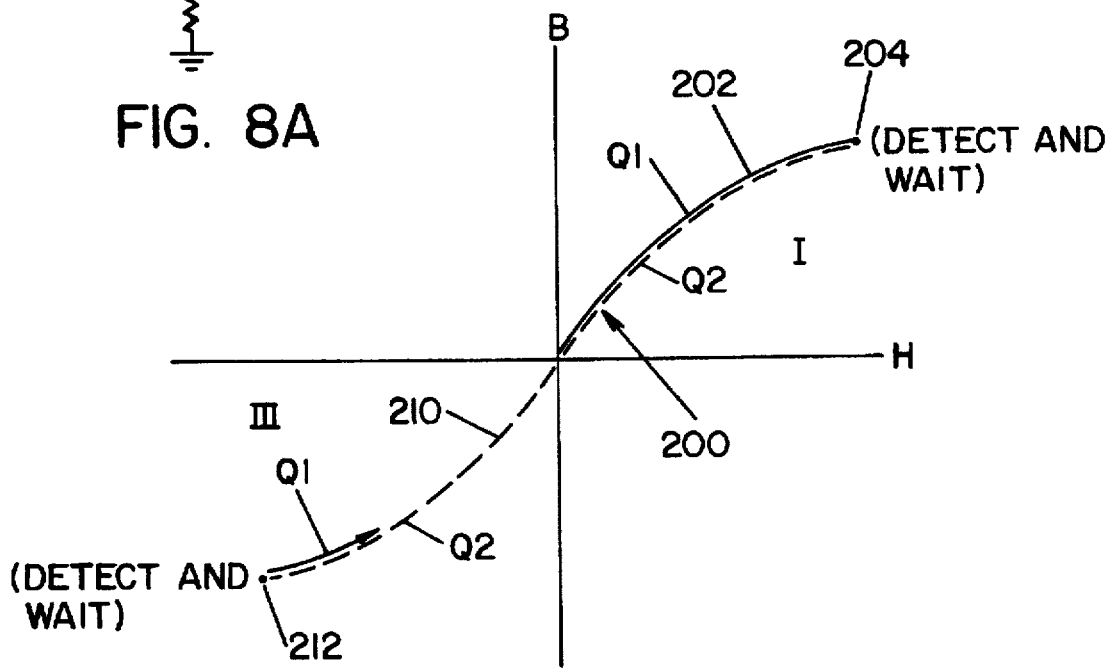
FIG. 9 is a B-H graph illustrating the magnetization of the transformer core C' shown in FIG. 7 when utilizing the invention as shown in FIG. 8.
Figure 10:
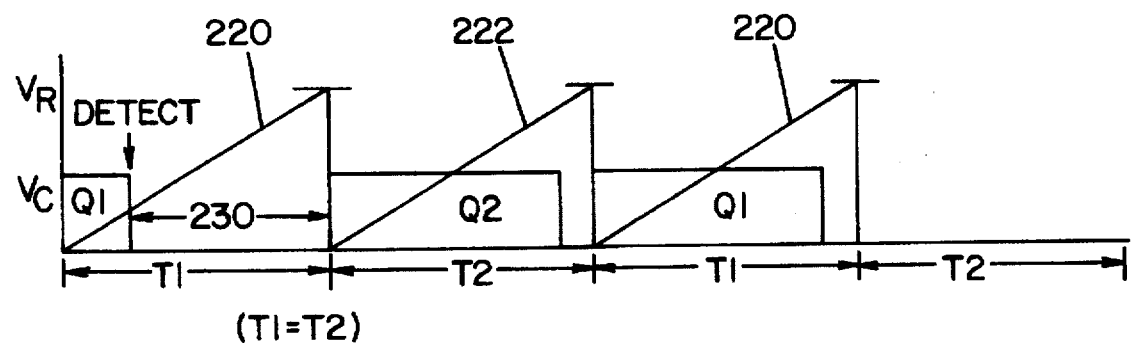
FIG. 10 is a voltage diagram of the internal ramp generator of the pulse width modulator with current pulses Q1, Q2 from the switching devices superimposed on a real time basis in accordance with operation of the embodiment of the invention illustrated in FIGS. 8 and 9.

A relatively broad implementation of the present invention is illustrated in the embodiment of FIGS. 8–10 wherein the pulse width modulator 100' has the same peripheral circuit elements, as pulse width modulator 100 in FIG. 1; however, to allow use of smaller core C', pulse width modulator 100' is provided with a circuit to sense the impending existence of a saturation of the core C' and create a "saturation signal". This circuit 150 creates a signal in line 150a to toggle one shot 152 when the core C' approaches saturation in either saturation quadrant I or quadrant III. Circuit 150 is shown in more detail in FIG. 8A, wherein a signal proportional to primary current $I_p$ is introduced into a differentiation network to provide a di/dt signal to the in threshold device 160. The output of this device is the logic on line 150a, referred to as the saturation signal. This signal sets one shot 152 which is inverted by inverter 154 to disable pulse width modulator 100'. By using this disabling feature for the standard pulse width modulator chip, core C' is magnetized and demagnetized in accordance with magnetization curve 200 of the B-H graph illustration in FIG. 9. When current pulse Q1 is in existence, for the first time, the core C' is magnetized along portion 202 of curve 200 until the core magnetization approaches saturation at point 204. At this time, a saturation signal appears in line 150a and current pulse Q1 is terminated, but period T1 continues. One shot 152 assures termination of the existing current pulse Q1. Thereafter, the next output condition or phase T2 of pulse width modulator 100' causes conduction transistors 30, 32 for the length of time a signal $Q_2$ exists on line 104, which creates a current pulse Q2. This pulse Q2 demagnetizes core C' along line 210 until saturation is detected at point 212. Line 150a contains a saturation signal to stop or terminate current pulse Q2. Of course, if current pulse Q2 is relatively short, demagnetization on curve 200 may not progress far enough to reach the remagnetization saturation point 212. Current pulse Q1 is then initiated during the next phase or output condition T1 of pulse width modulator 100'. As an alternative, core saturation can be sensed by measuring the total guass using a Hall Effect sensor with a threshold guass detector.

In a high frequency inverter power supply used for a non-demanding load, such as a current load below 20–30 amperes, there may not be an immediate high current requirement after the first saturation signal at Q1; therefore, the embodiment shown in FIGS. 8–10 will function well and gradually progress the pulses Q1, Q2 toward normal operation with saturation signal in line 150a terminating current pulse Q1 or Q2 when saturation occurs in either quadrant I or quadrant III. This is the broadest aspect of the present invention and allows operation of core C' in both quadrant I and quadrant III, so that there is enough "head room" in the B-H graph for magnetization and demagnetization without approaching the saturation for the core. This operation allows a drastic reduction in the size of the ferrite core without damages to switching devices 20, 22, 30 and 32. This first embodiment will accommodate certain variations in the core material and switching devices that are not matched. Saturation will not occur and normal operation can be carried out with only a occasional adjustment of current pulses Q1 or Q2 to prevent saturation of core C'. Operation of the embodiment of the invention illustrated in FIG. 8 and 8A is illustrated in FIG. 10. Voltage ramps 220 on capacitor 112 determine phase T1 during which current pulse Q1 is created. The same voltage ramps 222 occur during phase T2. When the inverter first starts, current pulse Q1 is initiated in phase T1. When there is a detection of an impending saturation, a signal line 150a causes a termination of current pulse Q1. In this manner, the pulse width modulator is waiting to start the next phase T2, which is created by the next voltage ramp 222 As soon as phase or period T2 is initiated, current pulse Q2 is created. This new pulse is shown as a full pulse having maximum duration and completely demagnetizes core C' in quadrant I and then remagnetized the core in quadrant III along line 210 as previously discussed with respect to FIG. 9. Thereafter, gating pulses $Q_1$, $Q_2$ alternately appear at the output of pulse width modulator 100' to drive transformer T of inverter 10. If second current pulse Q2 also causes saturation by reaching the remagnetization condition 212, as shown in FIG. 9, this second current pulse may also be shortened by a saturation signal in line 150a.

Figure 11:
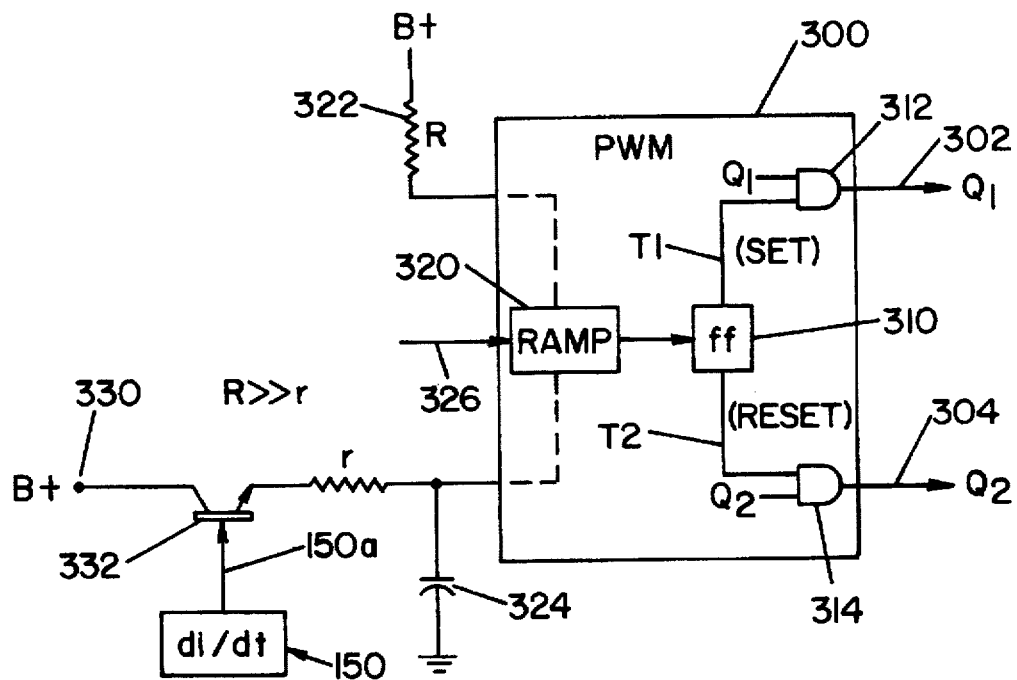
FIG. 11 is a schematic diagram of the modification of the peripheral elements of the pulse width modulator in accordance with the preferred embodiment of the present invention.
Figure 12:
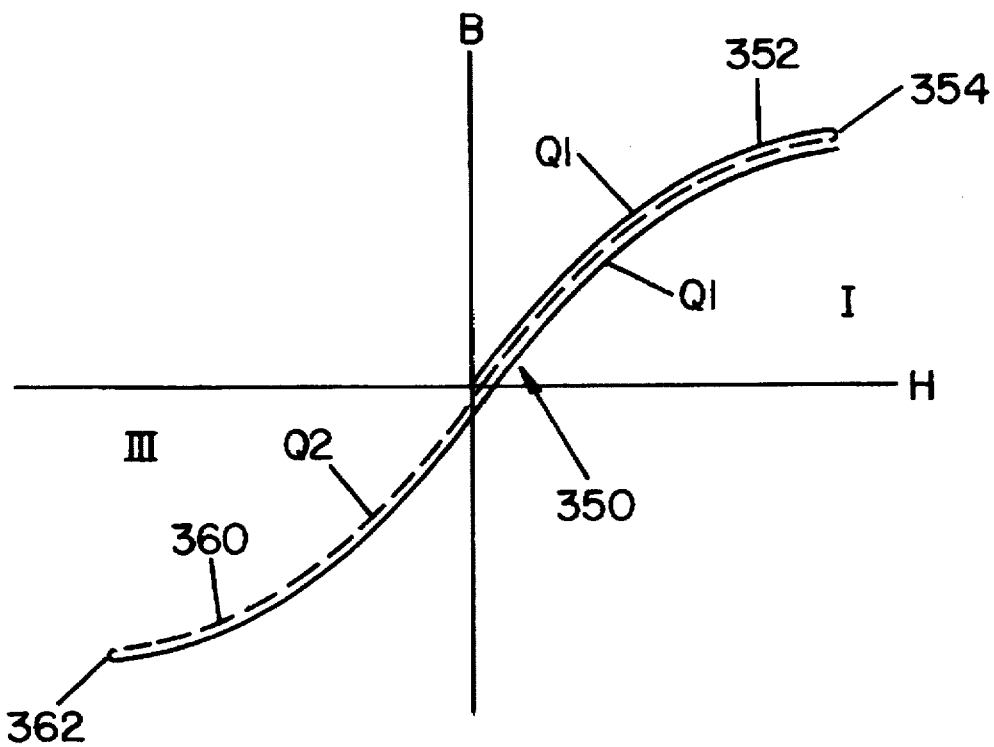
FIG. 12 is a B-H graph illustrating the magnetization curve for core C' using the preferred embodiment of the present invention, as shown in FIG. 11.
Figure 13:
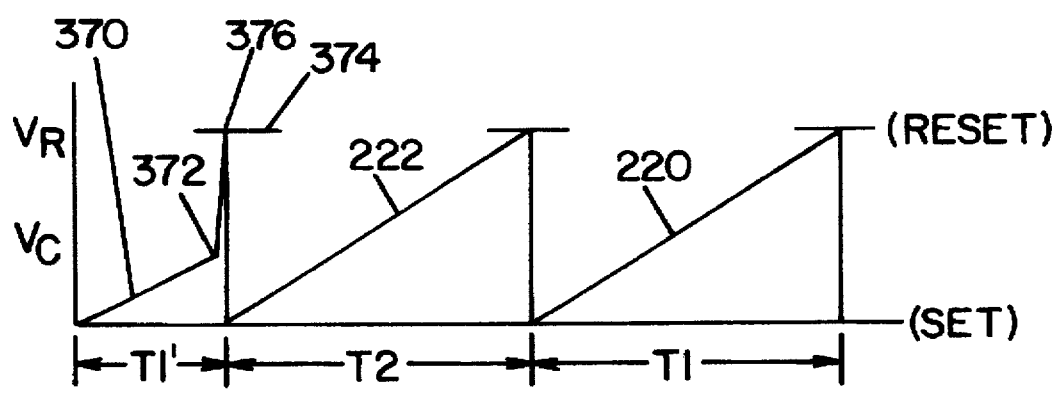
FIG. 13 is a voltage diagram showing the voltage across ramp control capacitor C of the embodiment of the invention shown in FIG. 11; and, FIGS. 14 and 15 are voltage diagrams with current pulses Q1 and Q2 superimposed on a real time basis showing the difference between the operation of the embodiment of the invention shown in FIG. 8 and the preferred embodiment of the invention shown in FIG. 11, respectively.

When the high frequency inverter 10 is to be used for D.C. electric arc welding, there is a demand for high current at the start of the welding cycle; therefore, the waiting period 230, as shown in FIG. 10, is not conducive to preventing transients and fulfilling the requirements for high current in an electric arc welder. Thus, the present invention has a preferred embodiment for specific application to electric arc welders, which embodiment is illustrated in FIGS. 11–13. Pulse width modulator 300 is essentially the same as pulse width modulators 100 and 100'; however, the $Q_1$ output 302 and the $Q_2$ output 304 are controlled by flip-flop 310, which is set during period or phase T1 and reset during period or phase T2. AND gates 312, 314 have inputs that include the set and reset conditions of flip-flop 310, together with the pulse width modulated gating pulses $Q_1$ or $Q_2$. Thus, flip-flop 310 determines the phase or output operating condition. Gating signal $Q_1$ or $Q_2$ creates the same signal $Q_1$ or $Q_2$ in lines 302, 304, respectively. The flip-flop provides a steering function to steer the conduction or gating pulses $Q_1$, $Q_2$ to the appropriate switching devices 20, 22 or 30, 32. Ramp generator 320 has a resistor 322 and a capacitor 324 that operates as previously discussed. A reference voltage on line 326 determines the frequency of pulse width modulator 300. In practice, the frequency is approximately 20 Khz. The voltage on capacitor 324 ramped up by being charged through resistor 322 until the ramp voltage or capacitor 324 reaches the adjusted level in reference voltage line 326. This intersection of the ramp voltage and reference voltage either sets or resets flip-flop 310 to initiate the next phase or output condition T1 or T2. In accordance with the invention, capacitor 324 is connected to a high voltage source 330 through a two position switch 332. When detector or sensing device 150 of FIG. 8A creates a saturation signal in line 150a, switch 332 is conductive which condition abruptly shifts the ramp voltage on capacitor 324 to a level beyond the reference voltage on line 326. This action immediately terminates the output condition or phase T1 or T2 which exist at the time of the saturation signal. In accordance with this embodiment of the invention, the actual phase T1 or T2 controlled by the flip-flop 310 is immediately reversed when there is an impending saturation of core C'.

Referring now to FIG. 12, during the initial operation of pulse width modulator 300, current pulse Q1 magnetizes the core in quadrant I along line 352 of magnetization curve 350 until there is a sensed saturation at point 354. At that time, not only is current pulse Q1 terminated, but also phase T1 is terminated. Phase T2 is immediately initiated with current pulse Q2 to demagnetize and then remagnetizes core C' along line 360 of magnetization curve 350. Under normal circumstances this demagnetization and remagnetization during current pulse Q2 does not reach the quadrant III saturation of core C' at point 362. If such quadrant III saturation is detected by a saturation signal in line 150a, switch 332 is again closed to terminate phase T2. Under normal circumstances the second phase T2 is not terminated, but if it were terminated, it would terminate not only current pulse Q2 but also output condition or phase T2. The operation of the invention illustrated in FIG. 11 is shown in FIG. 13. During the start up phase T1', voltage ramp 370 reaches a saturation point at 372 and thus a signal in line 150a causes an abrupt shift of ramp voltage 370 to reference voltage 374. This voltage intersection at 376 stops period or phase T1'.

Figure 14:
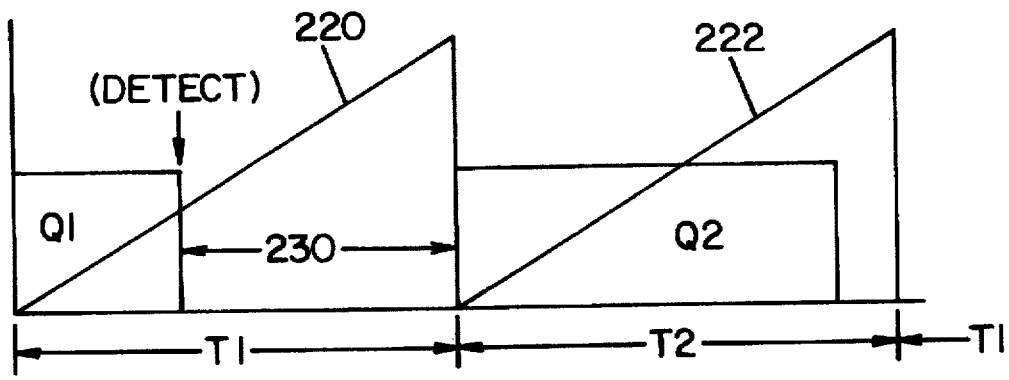
Figure 15:
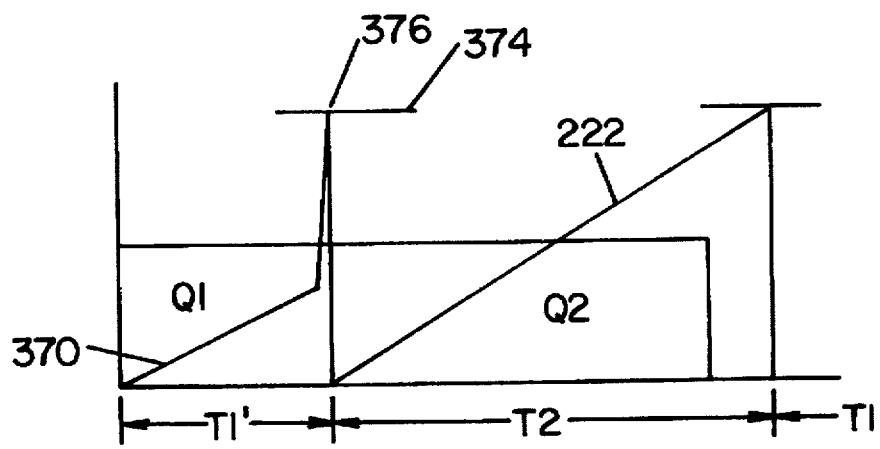

The voltage intersection functions to toggle flip-flip 310 to start phase or output condition T2, as shown in FIG. 11. Thereafter, the output phase T2 and T1 are repeated for normal operation of pulse width modulator 300 with ramp 222 at phase T2 and ramp 220 at phase T1. This control of the pulse width modulator allows core C' to operate along magnetization curve 350 in quadrant I and quadrant III, so that the size of core C' can be reduced when an effective area of about one-half the effective area of the core C. As shown in FIG. 15, current pulse Q1 and current pulse Q2 are directly adjacent to each other without the dead period 230, as shown in FIG. 14 representing the operating characteristics of the first embodiment of the invention illustrated in FIG. 8. By reducing the dead space 230, the preferred embodiment of the present invention accommodates transients and high current demand at the start of a welding cycle.

By using the present invention, ferrite core C is drastically reduced in cross-sectional area to a level approaching 50% while still assuring the core does not become saturated during high frequency operation of inverter 10. This invention is useful for high frequency inverters of various applications and allow not only a reduction in the area of the core, but also the use of a less expensive core material and the use of switching devices which are not matched to prevent creep toward saturation.

The distinction between the present invention and the prior art is best illustrated by reviewing B-H graph in the FIG. 6 and the B-H graph in FIG. 9. In the prior art, to prevent saturation core C was operated along a curve where magnetization and demagnetization occurred in quadrant I only. To provide the necessary "head room", the cross-sectional area of the core C had to be of a certain magnitude. As illustrated in FIG. 9, each successive current pulse Q1, Q2 from the pulse width modulator 300, or indeed the pulse width modulator 100' not only demagnetized core C', but also remagnetized core C' in the opposite direction. This demagnetization and then remagnetization in the opposite direction causes core C' to operate in both quadrant I and quadrant III. The "head room" necessary for accommodating the necessary amount of movement along the magnetization curve 350 is essentially reduced by 50% by using the present invention. Elimination of the dead space 230, shown in FIGS. 10 and 14, by the embodiment of the invention illustrated in FIG. 11 further improves the inverter to accommodate high current demands of a D.C. electric arc welder.

Having thus defined the invention, the following is claimed:

1. In an inverter power supply having an output transformer including a core of magnetically permeable material with an effective area, a primary winding on said core and a secondary output winding on said core; a first switch means for passing current through at least a portion of said primary winding to create a current pulse having a first polarity in said secondary output winding when said first switch means is conducting; a second switch means for passing current through at least a portion of said primary winding to create a current pulse having a second polarity in said secondary output winding when said second switch means is conducting; and, a pulse width modulator with a first output condition and a second output condition, means for alternately creating said conditions at a selected rate of at least 5 kHz to create alternating periods of said first and second output conditions, means for creating a first gate signal during said first output condition to render said first switch means conductive, means for creating a second gate signal during said second output condition to render said second switch means conductive, and means for controlling the duration of said first and second gate signals to control the alternating output current at said secondary output winding, the improvement comprising: operating said core in quadrants I and III of the B-H graph by controlling its effective area, sensing means for creating a control signal indicative of impending saturation of said core during the period of each of said first and second output conditions, and protection means for respectively terminating said first and second gate signals in response to said control signal during the period of the corresponding one of said first and second output conditions while allowing said pulse width modulator to create the succeeding one of said first and second output conditions at the termination of the period of the preceding output condition.

2. The improvement as defined in claim 1, wherein said protection means includes means for shortening the periods of said first and second output conditions.

3. The improvement as defined in claim 2 wherein said pulse width modulator includes means for generating a succession of ramp voltage signals each incrementing toward a fixed reference voltage and means for terminating an output condition when said ramp voltage intersects said reference voltage.

4. The improvement as defined in claim 3 further including means for forcing said ramp voltage signal above said reference signal in response to said control signal.

5. The improvement as defined in claim 3 wherein the rate of increment of said ramp voltage signal is controlled by a resistor and a capacitor with the ramp voltage being the voltage across said capacitor and said terminating means includes means for abruptly charging said capacitor.

6. The improvement as defined in claim 5 wherein said charging means includes a source of voltage greater than said fixed reference voltage, a switch to connect said source across said capacitor and said protection means includes means for closing said switch in response to said control signal.

7. The improvement as defined in claim 1 wherein said pulse width modulator includes means for generating a succession of ramp voltage signals each incrementing toward a fixed reference voltage and means for terminating an output condition when said ramp voltage intersects said reference voltage.

8. The improvement as defined in claim 7 further including means for forcing said ramp voltage signal above said reference signal in response to said control signal.

9. The improvement as defined in claim 8 wherein said sensing means includes at least one of means for determining the di/dt of the primary winding and means for creating said control signal when the di/dt exceeds a selected value.

10. The improvement as defined in claim 7 wherein said sensing means includes at least one of means for determining the di/dt of the primary winding and means for creating said control signal when the di/dt exceeds a selected value.

11. The improvement as defined in claim 7 wherein the rate of increment of said ramp voltage signal is controlled by a resistor and a capacitor with the ramp voltage being the voltage across said capacitor and said terminating means includes means for abruptly charging said capacitor.

12. The improvement as defined in claim 11 wherein said charging means includes a source of voltage greater than said fixed reference voltage, a switch to connect said source across said capacitor and said protection means includes means for closing said switch in response to said control signal.

13. The improvement as defined in claim 1 wherein said sensing means includes at least one of means for determining the di/dt of the primary winding and means for creating said control signal when the di/dt exceeds a selected value.

14. A method of driving the output transformer of an inverter type welder, said transformer including a core of magnetically permeable material having an area causing operation in quadrants I and III of the B-H graph with an effective area, a primary winding on said core and a secondary output winding on said core; said method comprising the steps of:

(a) providing a first switch means for passing current through at least a portion of said primary winding to create a current pulse having a first polarity in said secondary output winding when said first switch means is conducting;

(b) providing a second switch means for passing current through at least a portion of said primary winding to create a current pulse having a second polarity in said secondary output winding when said second switch means is conducting;

(c) providing a pulse width modulator having a first output condition and a second output condition and operating said modulator to alternately create said conditions at a selected rate of at least 5 kHz to create alternating periods of said first and second output conditions, to create a first gate signal during said first output condition to render said first switch means conductive, to create a second gate signal during said second output condition to render said second switch means conductive, and to control the duration of said first and second gate signals to control the alternating output current at said secondary output winding;

(d) creating a control signal indicative of impending saturation of said core during the period of each one of said first and second output conditions; and, (e) respectively terminating said first and second gate signals in response to said control signal during the period of the corresponding one of said first and second output conditions while creating the succeeding one of said first and second output conditions at the termination of the period of the preceding output condition.

15. A method as defined in claim 14 wherein said step of creating a control signal includes at least one of the steps of determining the di/dt of the primary winding and creating said control signal when the di/dt exceeds a selected value.

16. A method as defined in claim 14 including the further step of:

(f) shortening of the periods of said first and second output conditions.

17. A method as defined in claim 16 including the further steps of:

(g) causing said pulse width modulator to generate a succession of ramp voltage signals each incrementing toward a fixed reference voltage; and, (h) terminating an output condition when said ramp voltage intersects said reference voltage.

18. A method as defined in claim 17 including the further steps of:

(i) forcing said ramp voltage signal above said reference signal in response to said control signal.

19. A method as defined in claim 18 wherein said step of creating a control signal includes at least one of the steps of determining the di/dt of the primary winding and creating said control signal when the di/dt exceeds a selected value.

20. A method as defined in claim 17 wherein the rate of increment of said ramp voltage signal is controlled by a resistor and a capacitor with the ramp voltage being the voltage across said capacitor and said terminating step includes the step of abruptly charging said capacitor.

* * * * *